United States Patent
Zhao et al.

(10) Patent No.: US 10,142,198 B2
(45) Date of Patent: Nov. 27, 2018

(54) NODE-CENTRIC ANALYSIS OF DYNAMIC NETWORKS

(71) Applicant: Autodesk, Inc., San Rafael, CA (US)

(72) Inventors: Jian Zhao, Toronto (CA); Michael Glueck, Toronto (CA); Azam Khan, Ontario (CA)

(73) Assignee: AUTODESK, INC., San Rafael, CA (US)

( * ) Notice: Subject to any disclaimer, the term of this patent is extended or adjusted under 35 U.S.C. 154(b) by 177 days.

(21) Appl. No.: 15/144,627

(22) Filed: May 2, 2016

(65) Prior Publication Data
US 2017/0257291 A1    Sep. 7, 2017

Related U.S. Application Data

(60) Provisional application No. 62/304,547, filed on Mar. 7, 2016.

(51) Int. Cl.
  *G06F 13/00*   (2006.01)
  *H04L 12/26*   (2006.01)
  *H04L 12/24*   (2006.01)

(52) U.S. Cl.
  CPC ............ *H04L 43/045* (2013.01); *H04L 41/12* (2013.01); *H04L 41/22* (2013.01); *H04L 43/06* (2013.01)

(58) Field of Classification Search
  CPC ... H04L 43/045; H04L 43/0876; H04L 43/06; H04L 43/0817; H04L 43/04; H04L 69/40; H04L 41/082; H04L 41/0886; H04L 63/1433; H04L 41/22; H04L 41/12; G06F 19/12; G06F 17/30864

USPC .................................................. 709/224, 223
See application file for complete search history.

(56) References Cited

U.S. PATENT DOCUMENTS

| | | | | |
|---|---|---|---|---|
| 6,141,325 A | * | 10/2000 | Gerstel | .................... H04L 45/04 |
| | | | | 370/238 |
| 6,167,446 A | * | 12/2000 | Lister | ......................... G06F 9/50 |
| | | | | 709/202 |
| 6,282,175 B1 | * | 8/2001 | Steele | ................. G06F 11/0709 |
| | | | | 370/254 |
| 7,016,313 B1 | * | 3/2006 | Harper | .................... H04L 45/02 |
| | | | | 370/254 |

(Continued)

FOREIGN PATENT DOCUMENTS

| WO | 20120150107 A1 | 11/2012 | |
| WO | WO 2012150107 A1 * | 11/2012 | ............. G06F 19/12 |

OTHER PUBLICATIONS

International Search Report and Written Opinion for PCT/US2016/067951 dated Mar. 2, 2017.

(Continued)

*Primary Examiner* — Kenneth R Coulter
(74) *Attorney, Agent, or Firm* — Artegis Law Group, LLP

(57) ABSTRACT

A network analysis engine is configured to generate a network timeline that represents time-varying connectivity between nodes of the network over a time interval. The network timeline includes a sequence of network snapshots that illustrate links between nodes at specific, sequential sub-intervals of time. The network analysis engine is configured to organize the network timeline in order to reveal certain characteristics of the nodes in the network and the network as a whole. Based on these characteristics, the network can be optimized to improve overall network operation.

21 Claims, 12 Drawing Sheets

(56) References Cited

U.S. PATENT DOCUMENTS

| | | | | |
|---|---|---|---|---|
| 7,738,372 | B2* | 6/2010 | Elmasry | H04L 41/145 370/231 |
| 8,060,587 | B2* | 11/2011 | Ahmad | H04L 41/06 709/220 |
| 9,577,897 | B2* | 2/2017 | Dontcheva | H04L 43/045 |
| 2003/0140137 | A1* | 7/2003 | Joiner | H04L 41/044 709/224 |
| 2004/0054776 | A1* | 3/2004 | Klotz | H04L 41/06 709/224 |
| 2005/0060574 | A1* | 3/2005 | Klotz | H04L 41/22 726/4 |
| 2005/0076113 | A1* | 4/2005 | Klotz | H04L 41/12 709/224 |
| 2006/0153089 | A1* | 7/2006 | Silverman | H04L 41/145 370/252 |
| 2007/0011308 | A1* | 1/2007 | Brady, Jr. | H04L 41/06 709/224 |
| 2007/0198603 | A1* | 8/2007 | Tsioutsiouliklis | G06F 17/30864 |
| 2008/0281959 | A1* | 11/2008 | Robertson | H04L 43/0817 709/224 |
| 2009/0232016 | A1* | 9/2009 | Pruthi | H04L 41/22 370/252 |
| 2009/0248376 | A1* | 10/2009 | Silva | H04L 41/5009 703/2 |
| 2010/0039957 | A1* | 2/2010 | Kotrla | H04L 41/5009 370/253 |
| 2010/0205126 | A1* | 8/2010 | Andersen | G06F 17/10 706/13 |
| 2011/0106939 | A1* | 5/2011 | Kitamura | G06F 17/30088 709/224 |
| 2011/0145656 | A1* | 6/2011 | Baitinger | G06F 11/3476 714/45 |
| 2013/0232433 | A1* | 9/2013 | Krajec | G06F 3/048 715/771 |
| 2015/0058993 | A1* | 2/2015 | Choi | H04L 63/1433 726/25 |
| 2015/0071308 | A1 | 3/2015 | Webb, III et al. | |
| 2016/0357377 | A1* | 12/2016 | Thimbleby | G06F 3/1454 |
| 2016/0357496 | A1* | 12/2016 | Thimbleby | G06F 3/1454 |
| 2016/0357720 | A1* | 12/2016 | Thimbleby | G06F 3/1454 |
| 2017/0118093 | A1* | 4/2017 | Dontcheva | H04L 43/045 |
| 2017/0134247 | A1* | 5/2017 | Hoja | H04L 43/04 |
| 2017/0155557 | A1* | 6/2017 | Desai | H04L 41/147 |

OTHER PUBLICATIONS

A. Al-Awami, J. Beyer, H. Strobelt, N. Kasthuri, J. Lichtman, H. Pfister, and M. Hadwiger. 2014. NeuroLines: A Subway Map Metaphor for Visualizing Nanoscale Neuronal Connectivity. IEEE Transactions on Visualization and Computer Graphics 20, 12, 2369-2378.
B. Alper, B. Bach, N. Henry Riche, T. Isenberg, and J.-D. Fekete. 2013. Weighted Graph Comparison Techniques for Brain Connectivity Analysis. In Proc. SIGCHI Conference on Human Factors in Computing Systems. 483-492.
D. Archambault, H. C. Purchase, and B. Pinaud. 2011. Animation, small multiples, and the effect of mental map preservation in dynamic graphs. IEEE Transactions on Visualization and Computer Graphics 17, 4, 539-552.
B. Bach, N. Henry-Riche, T. Dwyer, T. Madhyastha, J.-D. Fekete, and T. Grabowski. 2015. Small MultiPiles: Piling Time to Explore Temporal Patterns in Dynamic Networks. Computer Graphics Forum 34, 3, 31-40.
B. Bach, E. Pietriga, and J.-D. Fekete. 2014a. GraphDiaries: Animated transitions and temporal navigation for dynamic networks. IEEE Transactions on Visualization and Computer Graphics 20, 5, 740-754.
B. Bach, E. Pietriga, and J.-D. Fekete. 2014. Visualizing Dynamic Networks with Matrix Cubes. In Proc. SIGCHI Conference on Human Factors in Computing Systems. 877-886.

F. Beck, M. Burch, S. Diehl, and D. Weiskopf. 2014. The state art in visualizing dynamic graphs. In EuroVis State-of-the-Art Reports (STARS).
P. Bellavista, A. Corradi, M. Fanelli, and L. Foschini. 2012. A Survey of Context Data Distribution for Mobile Ubiquitous Systems. Comput. Surveys 44, 4, 45 pages.
U. Brandes and B. Nick. 2011. Asymmetric relations in longitudinal social networks. IEEE Transactions on Visualization and Computer Graphics 17, 12, 2283-2290.
M. Burch, C. Vehlow, F. Beck, S. Diehl, and D. Weiskopf. 2011. Parallel edge splatting for scalable dynamic graph visualization. IEEE Transactions on Visualization and Computer Graphics 17, 12, 2344-2353.
L. Byron and M. Wattenberg. 2008. Stacked Graphs—Geometry & Aesthetics. IEEE Transactions on Visualization and Computer Graphics 14, 6, 1245-1252.
N. Elmqvist, T.-N. Do, H. Goodell, N. Henry, and J.-D. Fekete. 2008. ZAME: Interactive Large-Scale Graph Visualization. In Proc. IEEE Pacific Symposium on Visualization. 215-222.
Enron Data. accessed in 2015. http://enrondata.org.
M. Farrugia, N. Hurley, and A. Quigley. 2011. Exploring temporal ego networks using small multiples and tree-ring layouts. In Proc. International Conference on Advances in Computer-Human Interactions. 79-88.
D. Fisher. 2005. Using egocentric networks to understand communication. IEEE Internet Computing 9, 5, 20-28.
M. Freire, C. Plaisant, B. Shneiderman, and J. Golbeck. 2010. ManyNets: an interface for multiple network analysis and visualization. In Proc. SIGCHI Conference on Human Factors in Computing Systems. 213-222.
C. Friedrich and P. Eades. 2001. The Marey Graph Animation Tool Demo. In Graph Drawing, Joe Marks (Ed.). vol. 1984. Springer, 396-406.
M. Ghoniem, J.-D. Fekete, and P. Castagliola. 2005. On the Readability of Graphs Using Node-link and Matrix-based Representations: A Controlled Experiment and Statistical Analysis. Information Visualization 4, 2, 114-135.
M. Greilich, M. Burch, and S. Diehl. 2009. Visualizing the evolution of compound digraphs with TimeArcTrees. Computer Graphics Forum 28, 3, 975-982.
M. Grossetti. 2005. Where do social relations come from?: A study of personal networks in the Toulouse area of France. Social Networks 27, 4, 289-300.
S. Hadlak, H. Schulz, and H. Schumann. 2011. In Situ Exploration of Large Dynamic Networks. IEEE Transactions on Visualization and Computer Graphics 17, 12, 2334-2343.
P. Isenberg, F. Heimerl, S. Koch, T. Isenberg, P. Xu, C. Stolper, M. Sedlmair, J. Chen, T. Möller, and J. Stasko. 2015. Visualization Publication Dataset.
R. Keller, C. M. Eckert, and P. J. Clarkson. 2006. Matrices or Node-link Diagrams: Which Visual Representation is Better for Visualising Connectivity Models? Information Visualization 5, 1, 62-76.
N. W. Kim, S. K. Card, and J. Heer. 2010. Tracing Genealogical Data with TimeNets. In Proc. International Conference on Advanced Visual Interfaces. 241-248.
B. Lee, C. Plaisant, C. S. Parr, J.-D. Fekete, and N. Henry. 2006. Task Taxonomy for Graph Visualization. In Proc. AVI workshop on BEyond time and errors (BELIEVE). 1-5.
S. Liu, Y. Wu, E. Wei, M. Liu, and Y. Liu. 2013. StoryFlow: Tracking the Evolution of Stories. IEEE Transactions on Visualization and Computer Graphics 19, 12, 2436-2445.
A. J. Omalley, S. Arbesman, D. M. Steiger, J. H. Fowler, and N. A. Christakis. 2012. Egocentric social network structure, health, and pro-social behaviors in a national panel study of Americans. PLoS One 7, 5, e36250.
M. Papagelis, F. Bonchi, and A. Gionis. 2011. Suggesting Ghost Edges for a Smaller World. In Proc. International Conference on Information and Knowledge Management. 2305-2308.
F. Reitz. 2010. A Framework for an Ego-centered and Time-aware Visualization of Relations in Arbitrary Data Repositories. CoRR—Computing Research Repository abs/1009.5183.

(56) References Cited

OTHER PUBLICATIONS

S. Rutiange and M. J. McGuffin. 2013. DiffAni: Visualizing dynamic graphs with a hybrid of difference maps and animation. IEEE Transactions on Visualization and Computer Graphics 19, 12, 2556-2565.
Z. Sheny and K.-L. Maz. 2007. Path Visualization for Adjacency Matrices. In Proc. Joint Eurographics / IEEE VGTC Conference on Visualization. 83-90.
L. Shi, C. Wang, and Z. Wen. 2011. Dynamic network visualization in 1.5 D. In Proc. IEEE Pacific Visualization Symposium. 179-186.
M. Wattenberg. 2006. Visual Exploration of Multivariate Graphs. In Proc. of the SIGCHI Conference on Human Factors in Computing Systems (CHI '06). 811-819.
M. Wood. 2005. Bootstrapped Confidence Intervals as an Approach to Statistical Inference. Organizational Research Methods 8, 4, 434-470.
J. wook Ahn, C. Plaisant, and B. Shneiderman. 2014. A Task Taxonomy for Network Evolution Analysis. IEEE Transactions on Visualization and Computer Graphics 20, 3, 365-376.
Y. Wu, N. Pitipomvivat, J. Zhao, S. Yang, G. Huang, and H. Qu. 2016. egoSlider: Visual Analysis of Egocentric Network Evolution. IEEE Transactions on Visualization and Computer Graphics 22, 1, 260-269.
J. Zhao, C. Collins, F. Chevalier, and R. Balakrishnan. 2013. Interactive Exploration of Implicit and Explicit Relations in Faceted Datasets. IEEE Transactions on Visualization and Computer Graphics 19, 12, 2080-2089.
J. Zhao, Z. Liu, M. Dontcheva, A. Hertzmann, and A. Wilson. 2015. MatrixWave: Visual Comparison of Event Sequence Data. In Proc. SIGCHI Conference on Human Factors in Computing Systems. 259-268.

\* cited by examiner

NODE-CENTRIC ANALYSIS OF DYNAMIC NETWORKS

CROSS-REFERENCE TO RELATED APPLICATIONS

This application claims the benefit of U.S. provisional patent application titled "Egocentric Analysis of Dynamic Networks with Egolines," filed on Mar. 7, 2016 and having Ser. No. 62/304,547. The subject matter of this related application is hereby incorporated herein by reference.

BACKGROUND OF THE INVENTION

Field of the Invention

Embodiments of the present invention relate generally to network analysis and, more specifically, to a node-centric analysis of dynamic networks.

Description of the Related Art

A network generally includes a collection of nodes that are interconnected with one another via a set of links. For example, a computer network could include a collection of computers interconnected with one another via a set of wired or wireless data connections. Alternatively, a power distribution network could include a collection of power substations interconnected with one another via a set of power lines. Various tools exist for analyzing and visualizing the topologies of networks at given points in time. For example, a conventional network analysis tool could analyze a network and then generate a visualization that depicts the nodes of the network as well as the various interconnections between those nodes, at a particular point in time.

Network analysis tools are generally used to optimize the overall operation of the network. For example, a network analysis tool could be used to generate a visualization of the computer network mentioned above. Based on that visualization, a network engineer could determine that the interconnections between the network nodes should be adjusted in order to more effectively load balance network communications. By making those adjustments, the overall network throughput and/or quality of service can be increased.

One drawback associated with conventional network analysis tools is that those tools only generate visualizations of networks at individual points in time. The typical visualizations generated therefore fail to capture time-varying network dynamics. This shortcoming is especially problematic when analyzing networks that can change rapidly over short durations of time. For example, returning to the computer network example discussed above, if the computers in the network were able to dynamically change their respective connections, then analyzing the interconnections between those computers at a particular point in time would not yield any useful insight about the network because the network connections could be completely different only a short time later.

As the foregoing illustrates, what is needed in the art are more effective approaches to analyzing and visualizing networks.

SUMMARY OF THE INVENTION

Various embodiments of the present invention set forth a non-transitory computer-readable medium that, when executed by a processor, causes the processor to perform the steps of generating a first network snapshot that depicts, for a first sub-interval of time, a first set of nodes included in the network and a first set of connections associated with the first set of nodes, generating a second network snapshot that depicts, for a second sub-interval of time, a second set of nodes included in the network and a second set of connections associated with the second set of nodes, and generating a first node timeline included in the first network snapshot and the second network snapshot that is associated with a first node included in the network, where the first node timeline indicates one or more topological changes in the network between the first sub-interval of time and the second sub-interval of time.

At least one advantage of the approach discussed herein is that the network timeline represents the time-varying topology of the network over an entire time interval, as opposed to conventional approaches that represent network topology at a single point in time.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
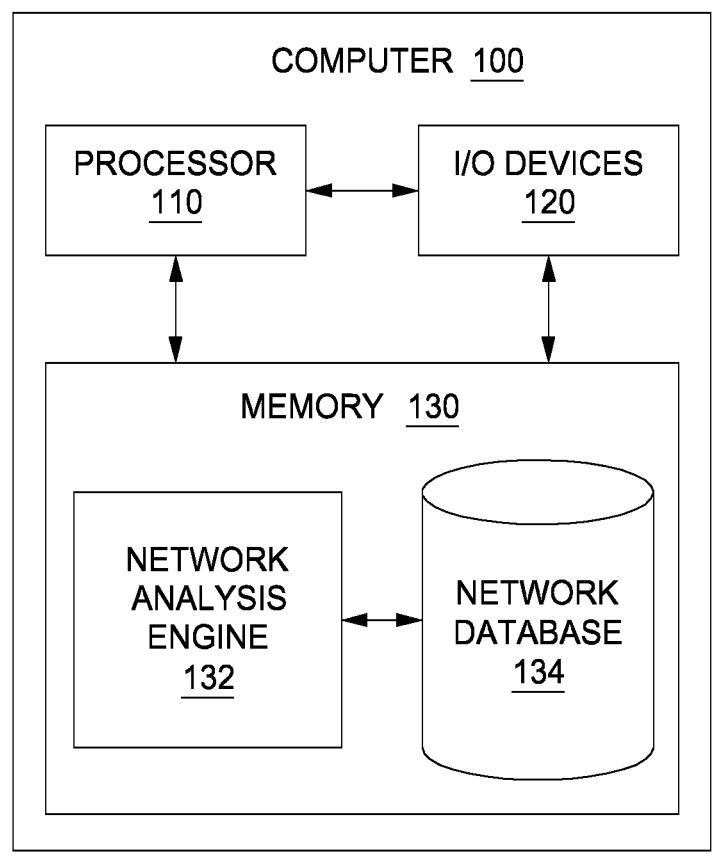
FIG. 1 illustrates a system configured to implement one or more aspects of the present invention.

FIG. 1 illustrates a system configured to implement one or more aspects of the present invention. As shown, a computer 100 includes a processor 110, input/output (I/O) devices 120, and a memory 130, coupled together. Processor 110 may be any technically feasible form of processing device configured process data and execute program code. Processor 110 could be, for example, a central processing unit (CPU), a graphics processing unit (GPU), an application-specific integrated circuit (ASIC), a field-programmable gate array (FPGA), any technically feasible combination of such units, and so forth. I/O devices 120 may include devices configured to receive input, including, for example, a keyboard, a mouse, and so forth. I/O devices 120 may also include devices configured to provide output, including, for example, a display device, a speaker, and so forth. I/O devices 120 may further include devices configured to both receive and provide input and output, respectively, including, for example, a touchscreen, a universal serial bus (USB) port, and so forth.

Memory 130 may be any technically feasible storage medium configured to store data and software applications. Memory 130 could be, for example, a hard disk, a random access memory (RAM) module, a read-only memory (ROM), and so forth. Memory 130 includes network analysis engine 132 and network database 134. Network analysis engine 132 is a software application that, when executed by processor 110, causes processor 110 to analyze network data stored in network database 134. The network data specifies information about nodes in the network and links between those nodes at each time step across an interval of time. Based on this data, network analysis engine 132 generates a visualization of the network that illustrates how the network evolves over the time interval. Network analysis engine 132 is described in greater detail below in conjunction with FIG. 2.

Figure 2:
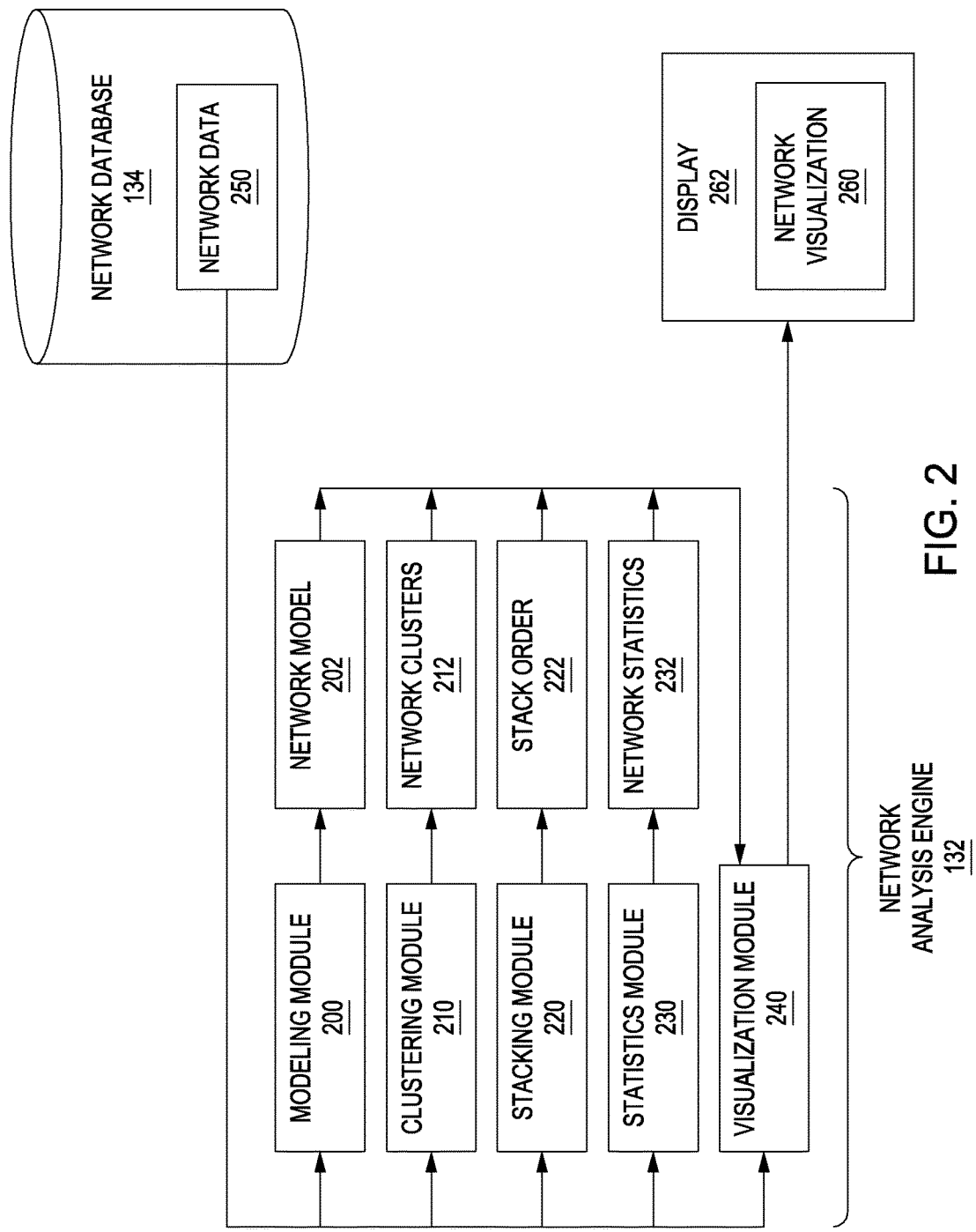
FIG. 2 is a more detailed illustration of the network analysis engine of FIG. 1, according to various embodiments of the present invention.

FIG. 2 is a more detailed illustration of the network analysis engine of FIG. 1, according to various embodiments of the present invention. As shown, network analysis engine 132 includes modeling module 200, clustering module, 210, stacking module 220, statistics module 230, and visualization module 240. As also shown, network database includes network data 250. The various modules within network analysis engine 134 are configured to process network data 250 and to then generate a network visualization 260, as described in greater detail below. A display device 262 then displays network visualization 260 to the end-user.

Modeling module 200 processes network data 250 to generate a network model 202. Network model 202 includes a plurality of "node timelines" which represent the time-varying connectivity of each node in the network during the time interval. Network model 202 may also include individual snapshots of the network at different points in time. Clustering module 210 module processes network data 250 to generate network clusters 212. Network clusters 212 indicate clusters of highly connected nodes within different sub-intervals. Stacking module 220 processes network data 250, and potentially network model 202 and network clusters 212, in order to determine a stack order 222 for the node timelines. Statistics module 230 is configured to process network data 250 and/or network model 202 to generate network statistics 232. Network statistics 232 include various values associated with the network as a whole and the individual nodes within the network. Visualization module 240 is configured to process network model 202, network clusters 212, stack order 222, and network statistics 232 to generate network visualization 260. An exemplary network visualization 260 is described in greater detail below in conjunction with FIGS. 3-10.

Exemplary Node-Centric Timeline Showing Evolution of a Network

FIGS. 3-10 set forth an exemplary network visualization 260 that represents the evolution of a network of authors over a five-year period. Each node in this network represents an author, and connections between nodes are formed when two authors collaborate to write a scientific paper. The type of network described in FIGS. 3-10 may be known in the art as an "authorship network." Persons skilled in the art will understand that the techniques described herein may be applied to analyze and visualize any technically feasible type of network, including social networks, computer networks, power grid networks, wired and wireless networks, and so forth.

Figure 3:
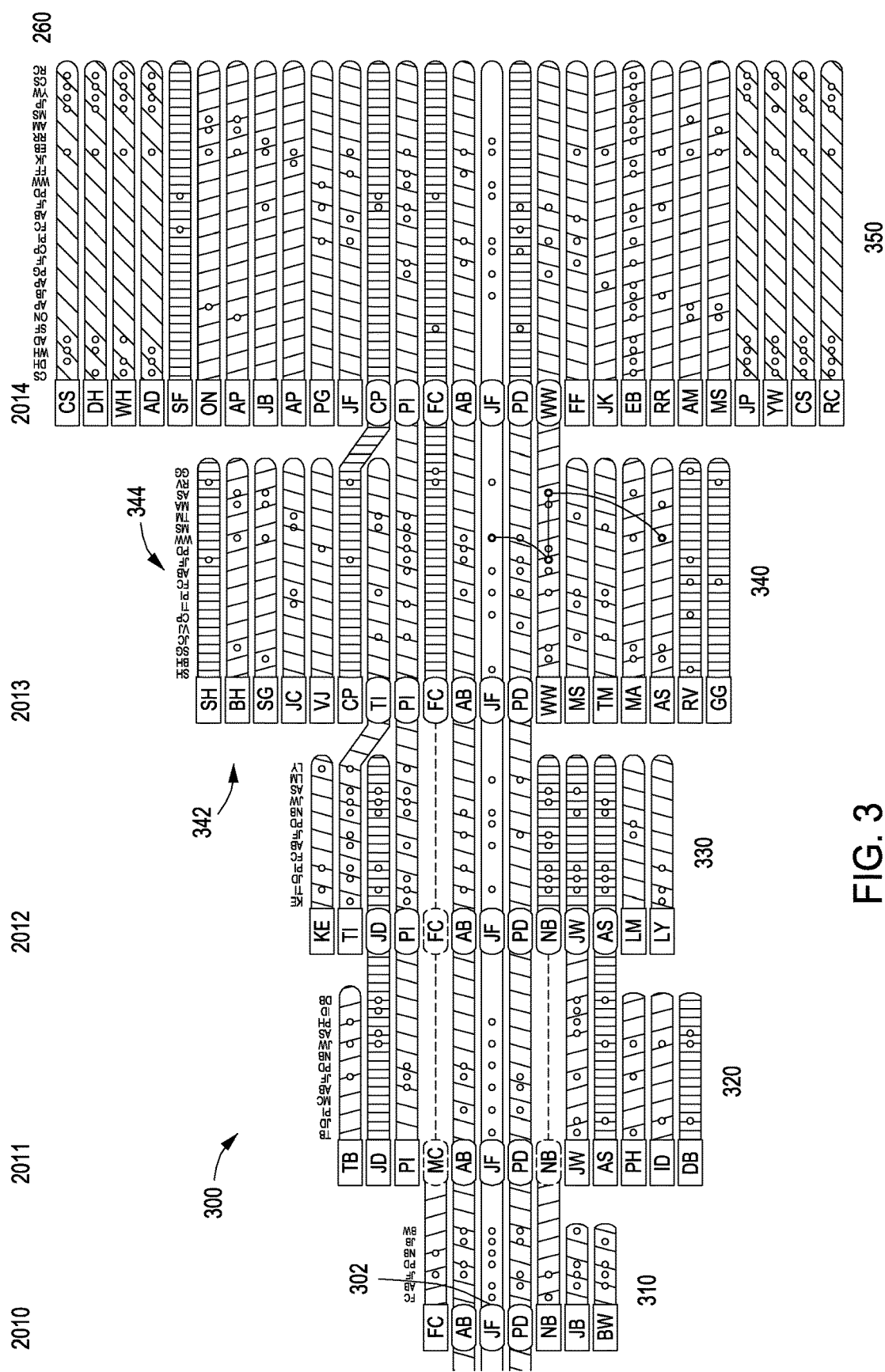
FIG. 3 illustrates a network timeline showing the evolution of an exemplary network over an interval of time, according to various embodiments of the present invention.

FIG. 3 illustrates a network timeline showing the evolution of an exemplary network over an interval of time, according to various embodiments of the present invention. As shown, network timeline 300 includes a plurality of node timelines 302. Network analysis engine 132 is configured to generate and organize network timeline 300 relative to a central node 304, labeled "JF," and the associated node timeline 306. In this example, JF refers to an author.

Each node timeline 302 traverses a sequence of sub-intervals of time. For each sub-interval, network timeline 300 includes a different network snapshot, such as network snapshots 310, 320, 330, 340, and 350. A given network snapshot indicates the nodes that reside within the network during the associated sub-interval and the connections between those nodes during the sub-interval. For example, network snapshot 340 includes node axes 342 and 344, which form an adjacency matrix that represents direct connections between the nodes indicated in the node axes.

Each node timeline may be displayed with a different color, pattern, outline, or other visually distinctive attribute. Node timelines having the same visual attribute are generally associated with clusters within the network. A cluster of nodes includes a subset of nodes in the network that are highly connected with one another relative to other nodes. In this example, a cluster could exist because a number of authors work in the same lab and therefore frequently coauthor papers. Clusters may change membership over time, and so nodes may drift from one cluster to another. For example, JW changes clusters between 2011 and 2012.

When a node first joins the network, the node may be displayed with a rectangular box. For example, FC joined the network in 2010, and is therefore displayed in network snapshot 310 with a rectangular box. During subsequent years, existing nodes are displayed with oval shapes. For example, in 2013, FC is displayed with an oval. If a node exits the network for a period of time, the node may be displayed with a dotted oval. For example, FC left the network from 2011 to 2012 and is therefore depicted with a dotted oval. In the context of this example, FC could have stopped publishing papers from 2011-2012, or could have stopped coauthoring papers with other members of the network during that time period.

By generating network timeline 300 in the manner described above, network analysis engine 132 may provide the end-user with a more complete understanding of the overall dynamics of the network than previously possible with conventional network analysis tools. Because network timeline 300 displays all connections between nodes at individual sub-intervals of time, the end-user can easily identify how the connectivity of specific nodes evolves. In addition, network timeline 300 can also be configured to display various other network data, as described in greater detail below in conjunction with FIG. 4.

Figure 4:
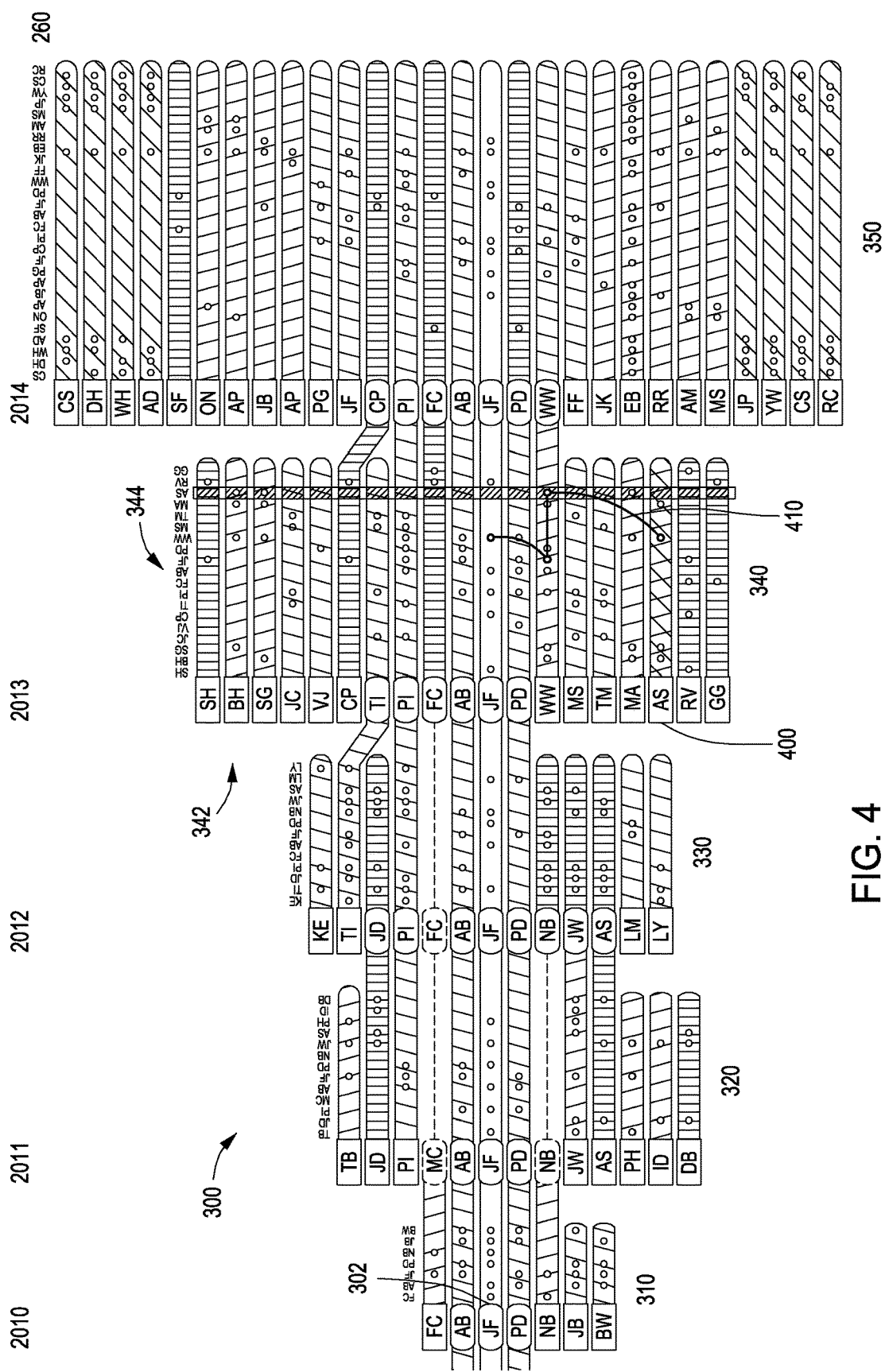
FIG. 4 illustrates an indirect connection between two nodes in the exemplary network within a sub-interval of time, according to various embodiments of the present invention.

FIG. 4 illustrates an indirect connection between two nodes in the exemplary network within a sub-interval of time, according to various embodiments of the present invention. As shown, network snapshot 340 includes a highlighted node timeline 400 associated with AS and connection sequence 410. Connection sequence 410 links AS to the central node, JF, by way of WW. In this manner, connection sequence 410 represents an indirect connection between AS and JF that includes the direct connections from AS to WW and from WW to JF. As mentioned, network analysis engine 132 identifies clusters of highly connected nodes. Network analysis engine 132 is also configured to reorganize some or all of network timeline 300 to emphasize these clusters, as described in greater detail below in conjunction with FIG. 5.

Figure 5:
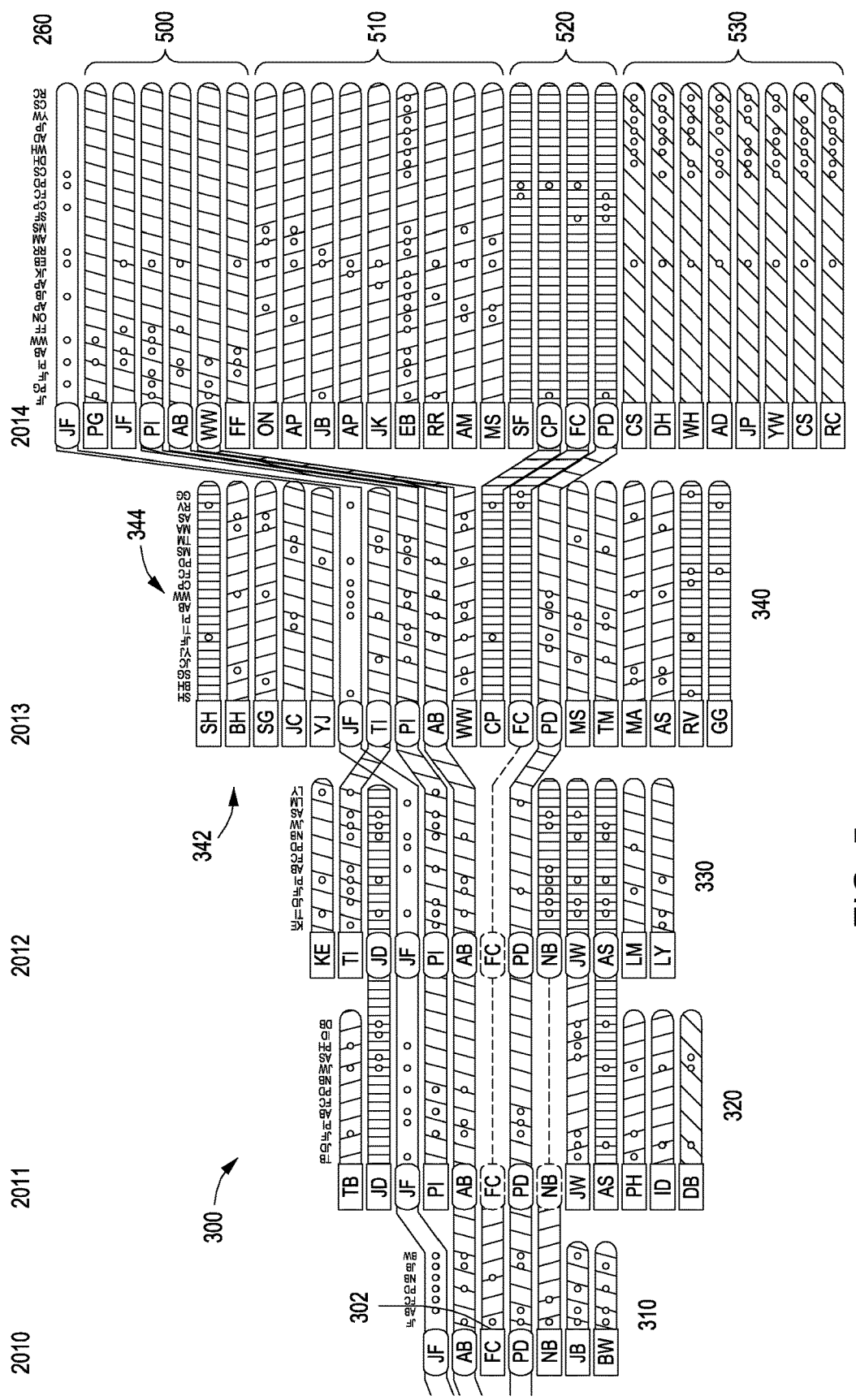
FIG. 5 illustrates the network timeline of FIG. 3 organized to highlight different node clusters in the exemplary network within a sub-interval of time, according to various embodiments of the present invention.

FIG. 5 illustrates the network timeline of FIG. 3 organized to highlight different node clusters in the exemplary network within a sub-interval of time, according to various embodiments of the present invention. As shown, network analysis engine 132 is configured to consolidate node timelines into representative groups 500, 510, 520, and 530 based on cluster membership. Each group represents a different node cluster during the time interval associated with network snapshot 350. Thus, groups 500, 510, 520, and 530 indicate collections of authors who coauthored scientific papers together in 2014.

The reorganization of network timeline 300 discussed above may reveal insights that would not be apparent with conventional network analysis tools. For example, inspection of group 530 reveals that this group includes a number of new authors each of whom shared authorship with the other authors of group 530 and with another author from group 510, EB. Because the nodes of group 530 are highly connected to one other yet lack many connections to other nodes, this group appears to operate in relative isolation. Further, because each member of group 530 coauthors with EB, EB may act as a "bridge" node between clusters, as described in greater detail below in conjunction with FIG. 6.

Figure 6:
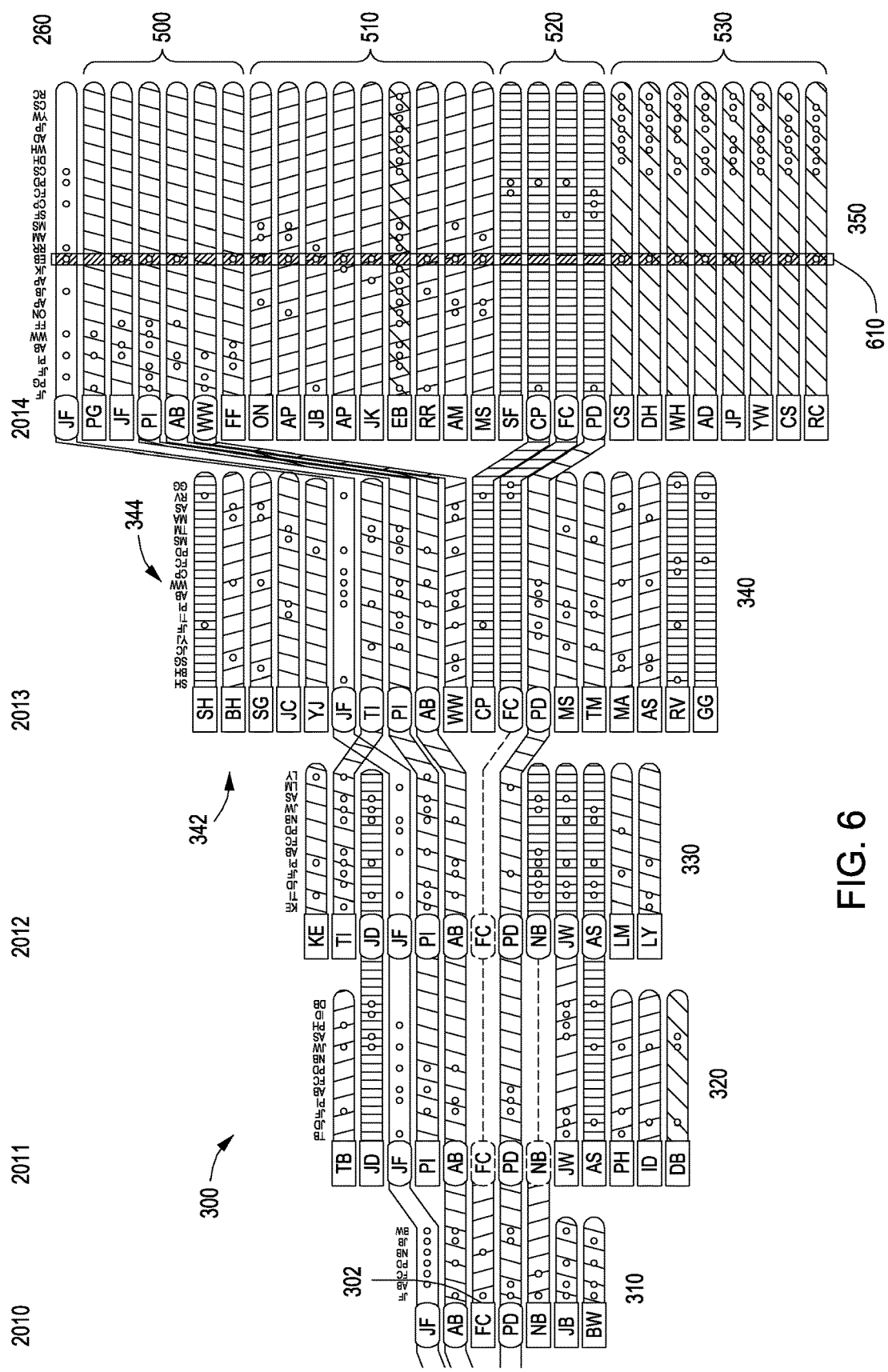
FIG. 6 illustrates a bridge node that connects different node clusters in the exemplary network within a sub-interval of time, according to various embodiments of the present invention.

FIG. 6 illustrates a bridge node that connects different node clusters in the exemplary network within a sub-interval of time, according to various embodiments of the present invention. As shown, node timeline 600 associated with EB is highlighted to show the connections between EB and other nodes during the sub-interval associated with network snapshot 350. EB is connected to nodes within almost all of the other clusters, reinforcing the notion that EB acts as a bridge node. Network analysis engine 132 is configured to reorganize network timeline 300 as a whole in order to emphasize the specific nodes that act as bridge nodes, as described in greater detail below in conjunction with FIG. 7.

Figure 7:
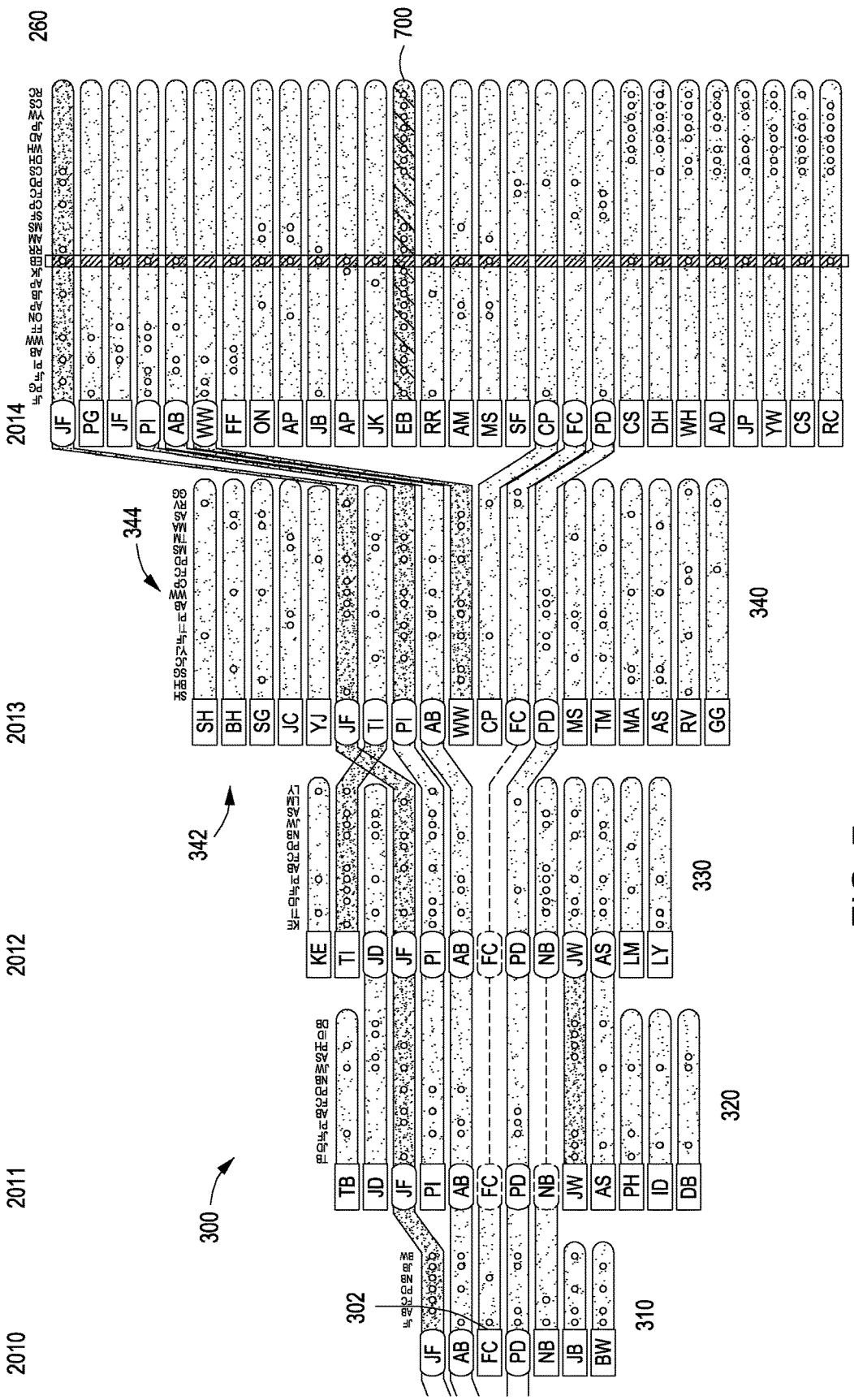
FIG. 7 illustrates the network timeline of FIG. 3 organized to show how the connectivity of each node in the exemplary network changes over an interval of time, according to various embodiments of the present invention.

FIG. 7 illustrates the network timeline of FIG. 3 organized to show how the connectivity of each node in the exemplary network changes over an interval of time, according to various embodiments of the present invention. As shown, the node timelines of network timeline 300 are displayed with different emphases. The emphasis with which a particular node timeline is displayed reflects the betweenness centrality ("betweenness") of that node relative to other nodes in the network. Persons skilled in the art of network analysis will understand that "betweenness" of a given node generally refers to the number of times that a given node acts as a bridge along the shortest path between two nodes.

Since the betweenness of each node changes over time, the different node timelines are displayed with changing emphasis over the time interval. For example, initially, node timeline 306 associated with JF is shown with greater emphasis relative to other node timelines. Over time, however, node timeline 600 associated with EB is shown with increasing emphasis as EB becomes more connected within the network. As network snapshot 350 indicates, by 2014 EB has the highest betweenness compared to the other nodes in the network.

In this manner, network analysis engine 132 is configured to organize and display network timeline 300 in different ways that can reveal important insights to the end-user. In the above example, network analysis engine 132 helped to reveal that node EB ha a growing influence over the network dynamics. Such insights may not be readily apparent with conventional network analysis tools. Network analysis engine 132 provides additional tools as well, described in greater detail below in conjunction with FIG. 8.

Figure 8:
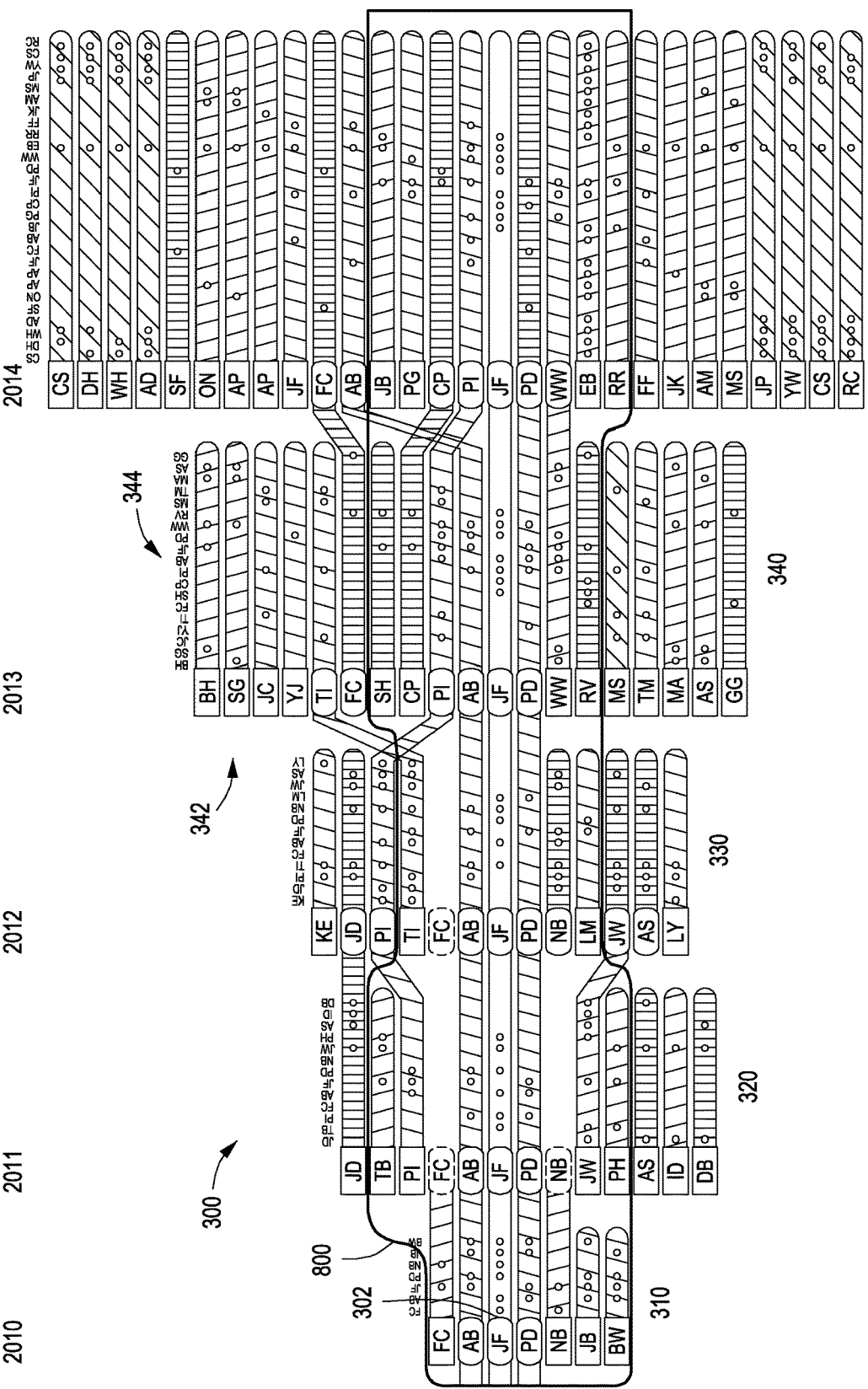
FIG. 8 illustrates how first-degree connections of a selected node in the exemplary network change during the interval of time, according to various embodiments of the present invention.

FIG. 8 illustrates how first-degree connections of a selected node in the exemplary network change during the interval of time, according to various embodiments of the present invention. As shown, network timeline 300 includes envelope 800 that encapsulates the first-degree connections of the selected node, JF, and the associated node timelines. Envelope 800 is shown to grow slightly over time. This slight growth reflects the fact that JF maintained a similar number of first-degree connections over time. Although JF added some new connections, such as LM shown in network snapshot 330, JF also lost some connections, such as JW also shown in network snapshot 330.

Network analysis engine 132 may also create envelopes showing more distant connections than first-degree connections. For example, network analysis engine 132 could generate an envelope showing fifth-degree connections of the selected node, among other degrees. In one embodiment, network analysis engine 132 may generate an envelope showing all connections less than or equal to a certain degree (e.g., fifth, fourth, third, second, and first, in the above example). In another embodiment, network analysis engine 132 may generate an envelope showing only the connections having a specific degree (e.g., fifth, in the above example).

Network analysis engine 132 may create envelopes in this fashion in order to compare the growth of a first-degree network to the overall growth of the network. Such comparison may allow the end-user to understand how a given node operates within the network and relative to other nodes in the network. Network analysis engine 132 may also generate and display various statistics associated with network nodes, as described in greater detail below in conjunction with FIG. 9.

Figure 9:
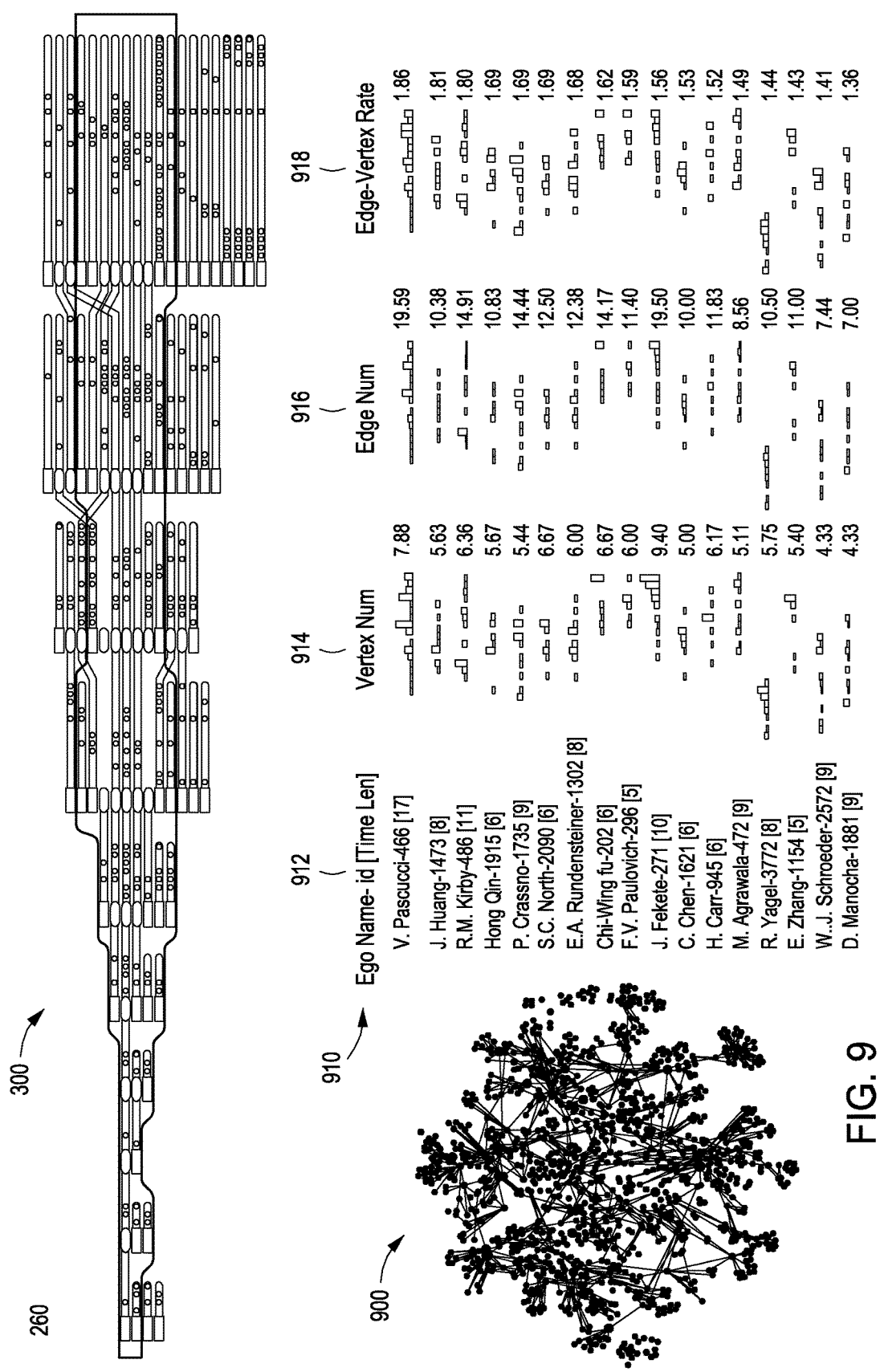
FIG. 9 illustrates a network topology snapshot of the exemplary network in conjunction with various node statistics associated with the nodes in the exemplary network, according to various embodiments of the present invention.

FIG. 9 illustrates a network topology snapshot of the exemplary network in conjunction with various node statistics associated with the nodes in the exemplary network, according to various embodiments of the present invention.

As shown, network visualization 260 includes network topology snapshot 900 that represents all nodes and edges within the network at a given point in time. Network visualization 260 also includes statistics 910 for each node (indicated by identifiers 912) over a short time interval. Statistics 910 include a number of vertices 914 associated with each node, a number of edges 916 associated with each node, and an edge-to-vertex ratio 918 associated with each node. Each statistic 910 shown for each node reflects a short interval of time and, therefore, indicates how those statistics change over time. For example, the node identified as "J. Fekete" or (JF, as discussed above) has a vertex number 914 shown to increase over a recent time interval, indicating increasing involvement in the network. Network timeline 300 is also shown, in minified format, above network topology 900 and statistics 910. With the view shown in FIG. 9, network analysis engine 132 may provide the end-user with a different approach to visualizing various data associated with the network and the growth of that network over time.

Figure 10:
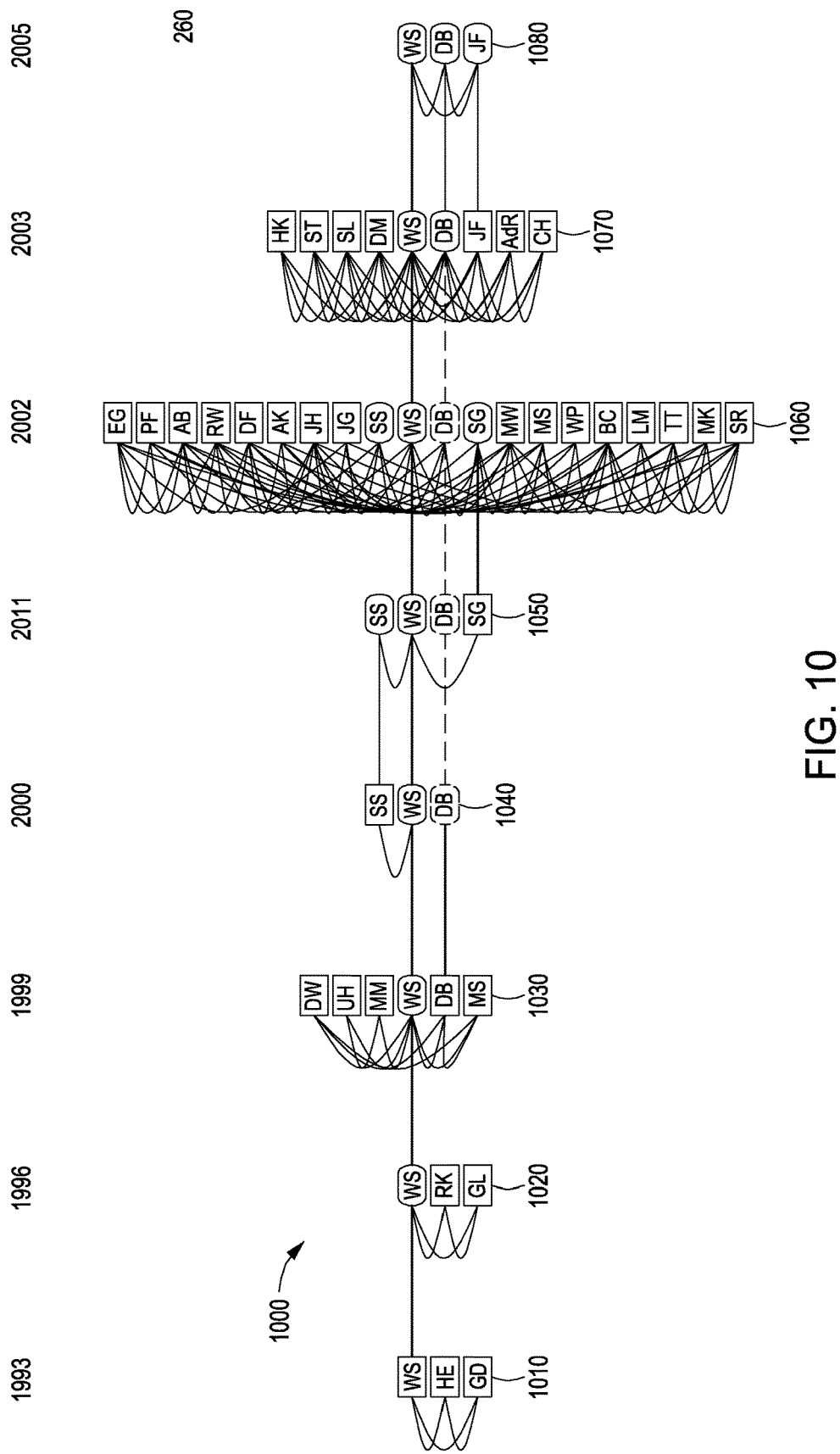
FIG. 10 illustrates an alternative network timeline that depicts connectivity between nodes in the exemplary network changing over the time interval, according to various embodiments of the present invention.

FIG. 10 illustrates an alternative network timeline that depicts connectivity between nodes in the exemplary network changing over the time interval, according to various embodiments of the present invention. As shown, network visualization 260 includes network timeline 1000 that includes network snapshots 1010, 1020, 1030, 1040, 1050, 1060, 1070, and 1080. These network snapshots span an interval of time from 1993 to 2005, where each year represents a sub-interval of time. Network analysis engine 132 generates each snapshot to depict both the specific nodes included in the network during the associated sub-interval of time, and the edges that connect those nodes during the sub-interval.

Referring generally to FIGS. 3-10, network analysis engine 132 is configured to perform the techniques described in these figures to analyze and visualize any technically feasible type of network. In doing so, network analysis engine 132 may identify certain trends, patterns, and behavior associated with the network that facilitates optimization of that network. For example, by identifying nodes with elevated "betweenness," as discussed above in conjunction with FIG. 7, network analysis engine 132 may determine specific network changes that can be performed to improve network communication and/or connectivity. The specific approaches described by way of example above are also discussed generically below in conjunction with FIGS. 11-12.

Procedures for Generating a Node-Centric Timeline

Figure 11:
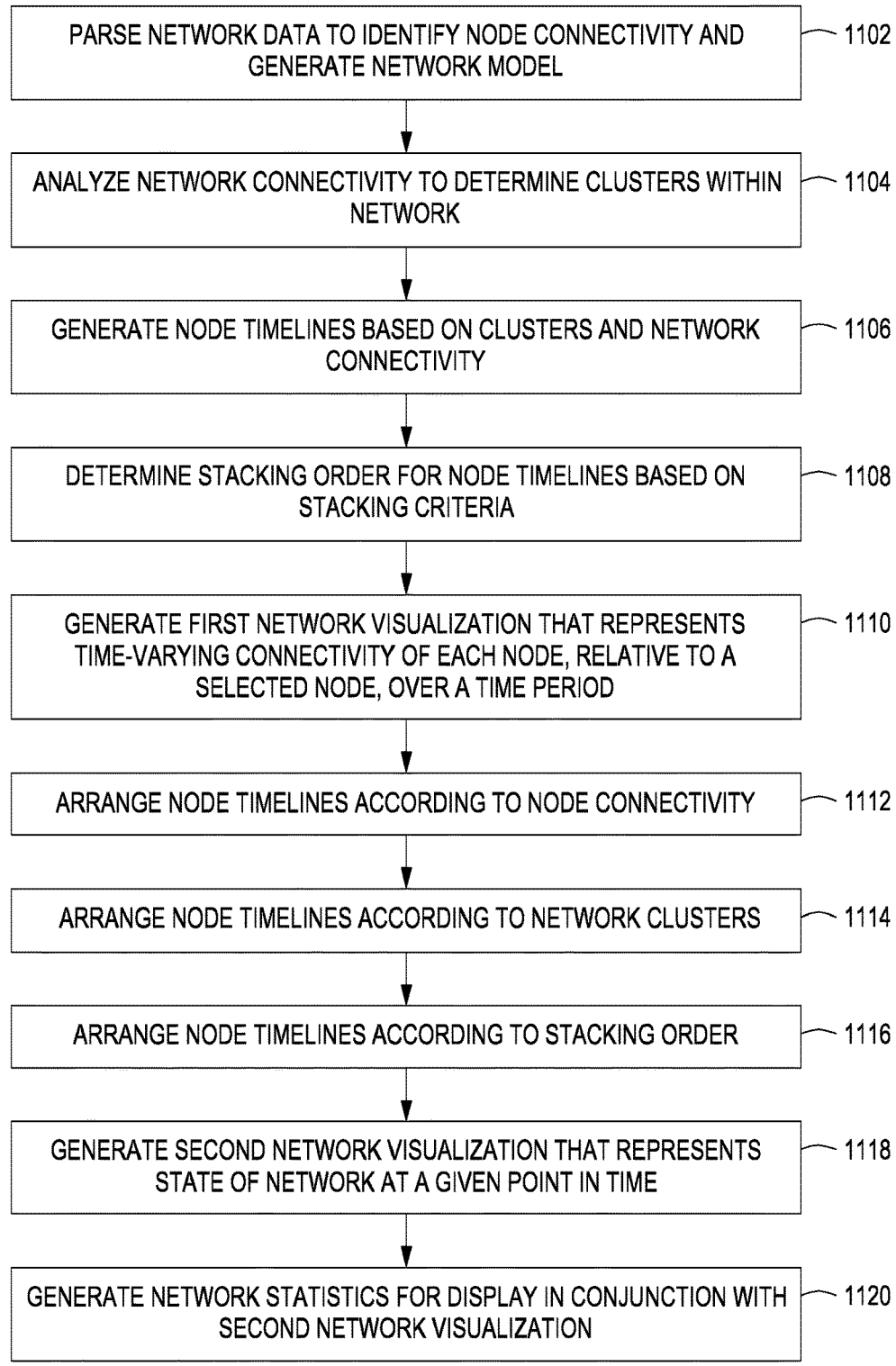
FIG. 11 is a flow diagram of method steps for generating a network timeline for a network, according to various embodiments of the present invention.

FIG. 11 is a flow diagram of method steps for generating a network timeline for a network, according to various embodiments of the present invention. Although the method steps are described in conjunction with the systems of FIGS. 1-10, persons skilled in the art will understand that any system configured to perform the method steps, in any order, is within the scope of the present invention.

As shown, a method 1100 begins at step 1102, where modeling module 200 within network analysis engine 132 parses network data 250 to identify time-varying node connectivity associated with a dynamic network. Based on network data 250, modeling module 200 also generates network model 202 that represents the network.

At step 1104, clustering module 210 within network analysis engine 132 analyzes the connectivity of the network to determine time-varying clusters within the network. Each cluster may represent a collection of nodes that have mutual connections with one another over a time period.

At step 1106, visualization module 240 within network analysis engine 132 generates node timelines that represent the time-varying connectivity of each node over a time interval. Visualization module 240 may also assign colors or other distinctive visual attributes to each node timeline to indicate cluster membership of each node over time.

At step 1108, stacking module 220 within network analysis engine 132 determines a stack order 222 for the node timelines generated at step 1106. Stacking module 220 determines stack order 222 based on a selected node timeline and other criteria, as discussed in greater detail below in conjunction with FIG. 12.

At step 1110, visualization module 240 within network visualization engine 132 generates a first network visualization that represents the time-varying connectivity of each node in the network, relative to a selected node, over a time period. An exemplary network visualization, that includes network timeline 300, is discussed in conjunction with FIGS. 3-9. In doing so, visualization engine 240 generates a sequence of network snapshots that include portions of the node timelines generated at step 1106. Each network snapshot illustrates the connectivity between nodes at a given sub-interval of time.

At step 1112, visualization module 240 arranges the node timelines based on the connectivity between nodes in order to illustrate first, second, third, and higher orders of connectivity between nodes, as discussed in conjunction with FIGS. 3-4 and 8. In one embodiment, visualization module 240 may also generate network timeline 1000 when performing step 1112.

At step 1114, visualization module 240 arranges the node timelines to illustrate network clusters within the network at a given sub-interval of time. FIGS. 5-7 illustrate one example of a network timeline within the first network visualization, organized to show specific network clusters.

At step 1116, visualization module 240 arranges the node timelines based on the stacking order determined at step 1108. The stacking order packs node timelines together in a manner that emphasizes node timeline length, minimizes node timeline crossings, and packs the node timelines together closely, as shown in FIGS. 3-4.

At step 1118, network analysis engine 132 generates a second network visualization that represents the topological state of the network at a given point in time. FIG. 9 illustrates exemplary network topology 900 that may be generated by network analysis engine 132 at step 1118.

At step 1120, statistics module 230 within network visualization engine 132 analyzes network data 250 and/or network model 202 to generate network statistics 232. Network statistics 232 include various values associated with the network as a whole and the individual nodes within the network. Visualization module 240 may then display the generated statistics within the second network visualization.

By implementing the method 1100, network analysis engine 132 is configured to generate the various exemplary visualizations shown in FIGS. 3-9. As mentioned above, a technique for determining the stacking order of the node timelines is described in greater detail below in conjunction with FIG. 12.

Figure 12:
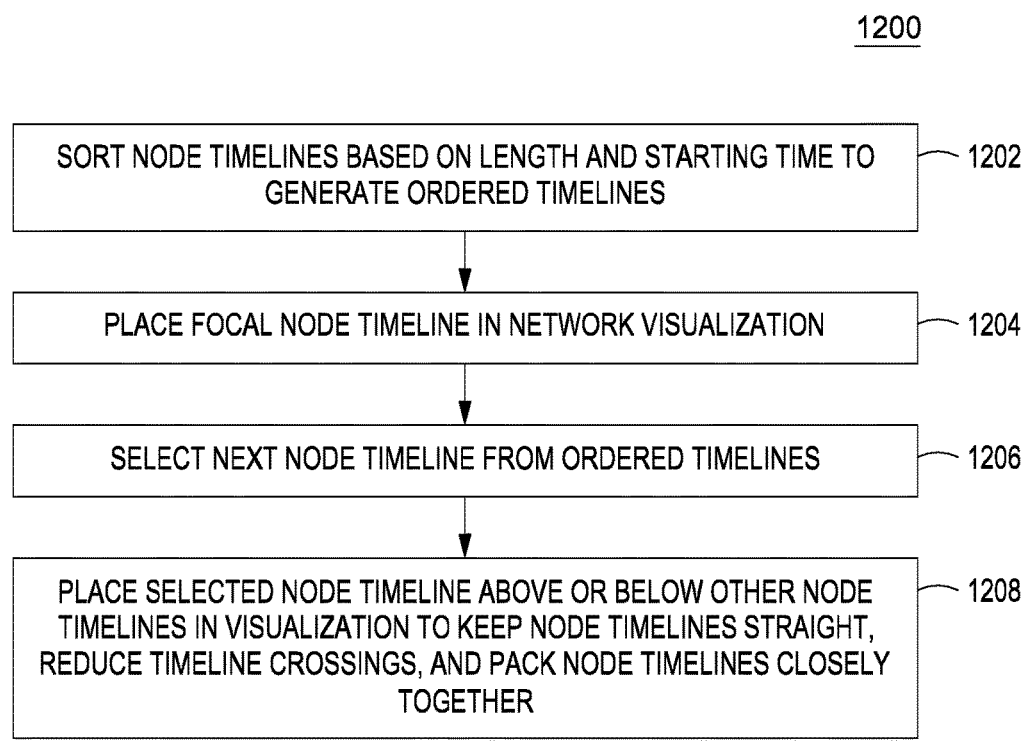
FIG. 12 is a flow diagram of method steps for stacking node timelines to generate a network timeline for a network, according to various embodiments of the present invention.

FIG. 12 is a flow diagram of method steps for stacking node timelines to generate a network timeline for a network, according to various embodiments of the present invention. Although the method steps are described in conjunction with the systems of FIGS. 1-10, persons skilled in the art will understand that any system configured to perform the method steps, in any order, is within the scope of the present invention.

As shown, a method 1200 begins at step 1202, where stacking module 220 within network analysis engine 132 sorts the node timelines based on length and stating time to generate a set of ordered timelines. At step 1204, visualization module 240 within network analysis engine 132 places a focal node timeline into the network visualization. The focal node timeline is associated with a user-selected node. At step 1206, stacking module selects the next node timeline from the ordered timelines generated at step 1202. At step 1208, stacking module 220 and visualization module 240, operating in conjunction with one another, place the selected node timeline above or below other node timelines in the network visualization to keep all node timelines relatively straight, reduce crossings between node timelines, and pack node timelines closely together. These various criteria may represent a set of heuristics or ranked priorities that stacking module 220 follows when determining stacking order. By implementing the method 1200, network analysis engine 132 is configured to organize the node timelines within network timeline 300 in a manner that is efficient and compact.

In sum, a network analysis engine is configured to generate a network timeline that represents time-varying connectivity between nodes of the network over a time interval. The network timeline includes a sequence of network snapshots that illustrate links between nodes at specific, sequential sub-intervals of time. The network analysis engine is configured to organize the network timeline in order to reveal certain characteristics of the nodes in the network and the network as a whole. Based on these characteristics, the network can be optimized to improve overall network operation.

At least one advantage of the approach discussed herein is that the network timeline represents the time-varying topology of the network over an entire time interval, as opposed to conventional approaches that represent network topology at a single point in time. Thus, the network analysis engine is capable of providing a greatly increased amount of information regarding the network compared to previous approaches, therefore enabling more informed decisions regarding how to manage the network.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A non-transitory computer-readable medium that, when executed by a processor, causes the processor to generate a network timeline for a network by performing the steps of:

generating a first network snapshot that depicts, for a first sub-interval of time, a first set of nodes included in the network and a first set of connections associated with the first set of nodes;

generating a second network snapshot that depicts, for a second sub-interval of time, a second set of nodes included in the network and a second set of connections associated with the second set of nodes;

generating a first node timeline included in the first network snapshot and the second network snapshot that is associated with a first node included in the network, wherein the first node timeline indicates one or more topological changes in the network between the first sub-interval of time and the second sub-interval of time;

identifying a first cluster of connected nodes within the network that includes the first node; and displaying the first node timeline using one or more visual attributes that differ from one or more corresponding visual attributes used to display at least one other node timeline associated with at least one other node that is included within the network and is not included in the first cluster.

2. The non-transitory computer-readable medium of claim 1, further comprising:

causing the first network snapshot to indicate a first subset of connections between the first node and the first set of nodes during the first sub-interval time; and causing the second network snapshot to indicate a second subset of connections between the first node and the second set of nodes during the second sub-interval time.

3. The non-transitory computer-readable medium of claim 1, wherein the first node has more connections to other nodes in the first cluster of nodes than connections to other nodes that are within the network, but are not included in the first cluster.

4. The non-transitory computer-readable medium of claim 1, further comprising grouping a set of node timelines associated with the first cluster of nodes within at least one of the first network snapshot and the second network snapshot.

5. The non-transitory computer-readable medium of claim 1, further comprising:

generating a second node timeline included in at least one of the first network snapshot and the second network snapshot that is associated with a second node included in the network; and generating a connection sequence that indicates one or more connections between the first node and the second node.

6. The non-transitory computer-readable medium of claim 5, wherein the one or more connections include a direct connection between the first node and the second node, or a sequence of indirect connections between the first node, one or more intermediate nodes, and the second node.

7. The non-transitory computer-readable medium of claim 1, further comprising updating one or more visual attributes of each node timeline included in the network timeline to indicate a degree of betweenness for each node timeline included in the network timeline.

8. The non-transitory computer-readable medium of claim 7, wherein the degree of betweenness for a first node timeline included in the network timeline corresponds to a number of node clusters within the network that include a particular node associated with the first node timeline.

9. The non-transitory computer-readable medium of claim 1, further comprising generating a first envelope that includes a first set of node timelines associated with a first set of nodes within the network that have first-degree connections to the first node.

10. The non-transitory computer-readable medium of claim 1, further comprising:

generating a second node timeline associated with the first sub-interval of time and the second sub-interval of time and that is associated with a second node included in the network; and adding the second node timeline to the first network snapshot and the second network snapshot to keep the first node timeline and the second node timeline packed closely together.

11. The non-transitory computer-readable medium of claim 1, wherein the first node timeline indicates one or more changes within the network between the first sub-interval of time and the second sub-interval of time.

12. The non-transitory computer-readable medium of claim 1, wherein the one or more visual attributes comprise at least one of a color, a pattern, and an outline.

13. The non-transitory computer-readable medium of claim 1, wherein the first cluster of nodes comprises a plurality of nodes within the network, and further comprising displaying each node timeline associated with each node in the first cluster using the one or more visual attributes for displaying the first node timeline.

14. A computer-implemented method for generating a network timeline for a network, the method comprising:

generating a first network snapshot that depicts, for a first sub-interval of time, a first set of nodes included in the network and a first set of connections associated with the first set of nodes;

generating a second network snapshot that depicts, for a second sub-interval of time, a second set of nodes included in the network and a second set of connections associated with the second set of nodes;

generating a first node timeline included in the first network snapshot and the second network snapshot that is associated with a first node included in the network, wherein the first node timeline indicates one or more topological changes in the network between the first sub-interval of time and the second sub-interval of time;

identifying a first cluster of connected nodes within the network that includes the first node; and displaying the first node timeline using one or more visual attributes that differ from one or more corresponding visual attributes used to display at least one other node timeline associated with at least one other node that is included within the network and is not included in the first cluster.

15. The computer-implemented method of claim 14, further comprising:

causing the first network snapshot to indicate a first subset of connections between the first node and the first set of nodes during the first sub- interval time; and causing the second network snapshot to indicate a second subset of connections between the first node and the second set of nodes during the second sub-interval time.

16. The computer-implemented method of claim 14, further comprising:

identifying a first cluster of nodes within the network that includes the first node and is associated with at least one of the first sub-interval of time and the second sub-interval of time; and causing one or more visual attributes of the first node timeline to differ from one or more corresponding visual attributes of at least one other node timeline associated with at least one other node that is included within the network, but is not included in the first cluster.

17. The computer-implemented method of claim 16, wherein the first node has more connections to other nodes in the first cluster of nodes than connections to other nodes that are within the network, but are not included in the first cluster, and further comprising grouping a set of node timelines associated with the first cluster of nodes within at least one of the first network snapshot and the second network snapshot.

18. The computer-implemented method of claim 14, further comprising:

generating a second node timeline included in at least one of the first network snapshot and the second network snapshot that is associated with a second node included in the network; and generating a connection sequence that indicates one or more connections between the first node and the second node, wherein the one or more connections include a direct connection between the first node and the second node, or a sequence of indirect connections between the first node, one or more intermediate nodes, and the second node.

19. The computer-implemented method of claim 14, further comprising:

generating a second node timeline associated with the first sub-interval of time and the second sub-interval of time and that is associated with a second node included in the network; and adding the second node timeline to the first network snapshot and the second network snapshot to keep the first node timeline and the second node timeline packed closely together.

20. The computer-implemented method of claim 14, further comprising generating a set of statistics that indicate, across the first sub-interval of time and the second sub-interval of time, a number of vertices associated with the first node, a number of edges associated with the first node, and an edge-to-vertex ratio associated with the first node.

21. A system for generating a network timeline for a network, comprising:

a memory storing a software application; and a processor that, when executing the software application, is configured to:

generate a first network snapshot that depicts, for a first sub-interval of time, a first set of nodes included in the network and a first set of connections associated with the first set of nodes;

generate a second network snapshot that depicts, for a second sub- interval of time, a second set of nodes included in the network and a second set of connections associated with the second set of nodes;

generate a first node timeline included in the first network snapshot and the second network snapshot that is associated with a first node included in the network, wherein the first node timeline indicates one or more topological changes in the network between the first sub-interval of time and the second sub-interval of time;

identify a first cluster of connected nodes within the network that includes the first node; and display the first node timeline using one or more visual attributes that differ from one or more corresponding visual attributes used to display at least one other node timeline associated with at least one other node that is included within the network and is not included in the first cluster.

* * * * *

UNITED STATES PATENT AND TRADEMARK OFFICE
CERTIFICATE OF CORRECTION

PATENT NO. : 10,142,198 B2
APPLICATION NO. : 15/144627
DATED : November 27, 2018
INVENTOR(S) : Jian Zhao, Michael Glueck and Azam Khan It is certified that error appears in the above-identified patent and that said Letters Patent is hereby corrected as shown below:

On the Title Page

(56) References Cited:
Other Publications, Page 3, please delete "S. Rutiange and M. J. McGuffin. 2013. DiffAni: Visualizing dynamic graphs with a hybrid of difference maps and animation. IEEE Transactions on Visualization and Computer Graphics 19, 12, 2556-2565." and insert --"S. Rufiange and M. J. McGuffin. 2013. DiffAni: Visualizing dynamic graphs with a hybrid of difference maps and animation. IEEE Transactions on Visualization and Computer Graphics 19, 12, 2556-2565.--.

Signed and Sealed this
Twenty-second Day of January, 2019

Andrei Iancu
*Director of the United States Patent and Trademark Office*